Patented Feb. 13, 1940

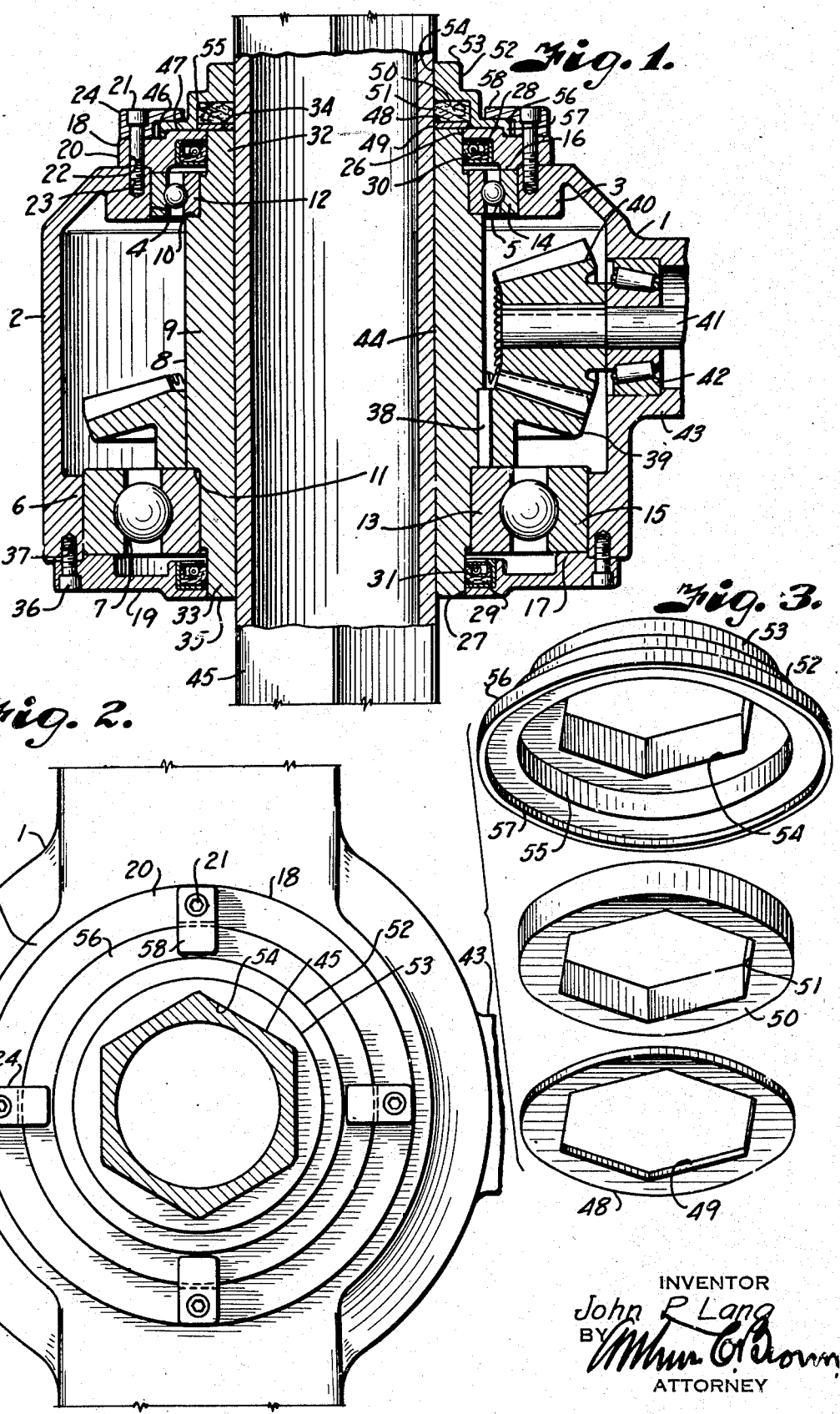

2,189,912

UNITED STATES PATENT OFFICE 2,189,912

GEAR BOX FOR DRILLING APPARATUS

John P. Lang, Enid, Okla., assignor to The George E. Failing Supply Company, Enid, Okla., a corporation of Oklahoma Application January 12, 1938, Serial No. 184,655

7 Claims. (Cl. 74—606)

This invention relates to gear boxes and particularly to those used in drilling apparatus for enclosing the driving gears which operate the drive or pull rod to effect rotation of a drill bit.

In apparatus of this character a drilling fluid, such as mud, is circulated through the drilling string; therefore, mud and water frequently flow down over the drive rod and enter the gear box from the top, rendering the contained lubricant unfit for lubrication purposes. This fluid also collects within the drive sleeve through which the drive rod is slidably extended, with the result that the mud forms an abrasive material that wears the drive rod and the drive sleeve through which it extends.

It is, therefore, a principal object of the present invention to provide a gear box and drive rod with means for preventing foreign material, such as the drilling fluid, from entering the gear box as well as the driving connection between the drive rod and the driving sleeve through which the rod is slidably mounted incidental to drilling operations.

In accomplishing these and other objects of the invention, as hereinafter pointed out, I have provided improved details of structure, the preferred form of which is illustrated in the accompanying drawing, wherein:

Fig. 1 is a vertical section through a gear box and drive rod equipped with a packing embodying the features of the present invention.

Fig. 2 is a horizontal section through the drive rod and illustrating the gear box in plan.

Fig. 3 is a perspective view of the parts of the packing shown in disassembled spaced relation to better illustrate their construction.

Referring more in detail to the drawing.

1 designates a gear box, such as is used in connection with rotary drilling apparatus, and which includes a housing having an annular wall 2 and an upper, inwardly extending flange 3, forming a bearing opening 4 in which is mounted an anti-friction bearing 5. Formed on the lower end of the housing is an inwardly extending, annular rib 6 encircling an anti-friction bearing 7 that cooperates with the antifriction bearing 5 to mount a driving sleeve 8. The sleeve 8 has a central body 9, provided at the ends thereof with oppositely arranged stop shoulders 10 and 11 for engaging the inner races 12 and 13 of the respective bearings to retain the sleeve in concentric relation with the housing and from longitudinal movement in a vertical direction. The outer races 14 and 15 of the respective bearings are engaged by annular ribs 16 and 17 of cover plates 18 and 19. The cover plate 18, at the upper end of the gear box, closes the opening formed by the flange 3 and has an annular rim 20 seated upon the flange of the gear box for retention by cap screws 21 that extend through suitable openings 22 therein and into threaded sockets 23 of the flange, as clearly shown in Fig. 1.

The stud bolts also mount packing retaining members 24 which are drawn tightly against the cover plate by the heads of the cap screws 21. The heads of the cap screws are preferably countersunk within the packing retaining members and have polygonal shaped sockets 25 adapted to be engaged by a suitable wrench (not shown). The cover plates are provided with openings 26 and 27 having inwardly facing countergrooves 28 and 29 for containing sealing rings 30 and 31 adapted to sealingly engage reduced extensions 32 and 33 on the drive sleeve, and which have their end faces 34 and 35 aligning substantially flush with the outer faces of the cover plates, as clearly shown in Fig. 1. The lower cover plate is retained in closing relation with the bottom of the housing by similar cap screws 36, extending through the rim of the cover plate and into threaded sockets 37 formed in the lower end of the housing.

Rotatable within the housing, and keyed on the drive sleeve by a suitable spline 38, is a beveled gear 39 that meshes with a beveled pinion 40 keyed on a drive shaft 41. The drive shaft 41 is mounted in a suitable anti-friction bearing 42 that is carried within a lateral extension 43 of the housing, as shown in Fig. 1.

The drive sleeve 8 is provided with an axial polygonal shaped bore 44 to slidably pass a hollow drill rod 45 through which the drill pipe is extended. The drill pipe (not shown) is operably connected with the drive rod by a suitable chuck (not shown), so that when the gears 39 and 40 are actuated by means of a prime mover connected with the shaft 41, they effect rotation of the drill pipe through the drive sleeve and drill rod as customary with this type of equipment.

As the drilling operation proceeds the drill rod moves downwardly through the drive sleeve under applied pressure or through the weight of the drill pipe acting upon the bit. It often happens that a drilling fluid, such as a mixture of mud and water, runs down over the drive rod and tends to enter the gear box through the packing ring 26 so that the lubricant normally contained within the housing is rendered unfit for lubrication and the gears and bearings are subjected to abrasion and excessive wear. The drilling fluid also tends to enter between the drive rod and the bore of the sleeve so that the driving faces thereof are likewise subject to abrasion and wear by the mud. In order to prevent these difficulties and at the same time allow for movement of the drill rod in the sleeve, I provide an improved packing, as now to be described.

The upper surface of the cover plate 20 is provided with an annular shoulder 46, spaced radially from the drive rod, and an annular, substantially horizontal seating surface 47 aligning with the upper end face of the drive sleeve, as shown in Fig. 1. Sleeved over the drive rod is a wearing washer 48 having a polygonal shaped opening 49 therein corresponding to the polygonal shaped bore of the drive sleeve. The washer 48 is preferably of suitable diameter to overlap the joint between the sleeve extension and the cover plate, as shown in Fig. 1. Also sleeved on the drill rod is a packing ring 50 formed of resilient and compressible material and having a polygonal shaped opening 51 corresponding to that of the washer 48.

In order to retain the packing in compressed condition and in sealing relation with the drill rod, I provide a cap plate or collar 52, having a central hub portion 53 that is provided with a polygonal shaped opening 54 corresponding to the cross-section of the drill rod, and an aligning cylindrical recess 55 for accommodating the packing 50 and the washer 48. The recess is of less depth than the combined thickness of the washer 48 and packing 50 to effect sufficient compression of the packing so that a seal is formed between the engaged surfaces of the drive rod and the cap plate 52. The cap plate 52 has an annular extending, peripheral flange 56 that seats upon the surface 46 and which terminates in a depending flange 57 adapted to extend downwardly over the shoulder 46 and cooperate with the packing in forming sealing surfaces to further exclude foreign material from passing into the gear box.

The cap plate just described thus rotates with the drive rod and sleeve, carrying with it the packing 50 and the washer 48. The sealing surfaces of the annular flange closely engage the sealing surface of the cover plate. The cap plate is retained in position on the gear box by means of the retaining members 24, which have inwardly directed fingers or lugs 58 overlapping the annular flange of the cap plate, as clearly shown in Figs. 1 and 2. Therefore, when the drive rod is raised and lowered within the drive sleeve, the cap plate is retained thereon in sealing relation with the drive rod to prevent leakage of drilling fluid in and around the sleeve.

From the foregoing it is obvious that I have provided a seal which effectively prevents entrance of drilling fluid into the gear box, as well as into the driving bore of the drive sleeve, to avoid wear incidental to the abrasive action of the mud and grit contained in the drilling fluid.

While I have illustrated and described the driven member 45 as a drive rod, it is obvious that the member 45 may be considered a kelly rod which is directly connected at the upper end of a drill pipe. In this instance the drill pipe is rotated directly through the kelly rod and any leakage is prevented from entering the space between the sleeve and the kelly rod in the same manner as when the member 45 is considered a drive rod through which a string of drill pipe is extended, as in the case of a conventional core or shot-hole drilling apparatus.

What I claim and desire to secure by Letters Patent is:

1. A gear box of the character described including a drive sleeve having its end rotatably mounted in the gear box and provided with a polygonal bore, a driven member having a cross-section shaped to correspond to the bore of the drive sleeve, and means carried by the gear box for sealing the space between the driven member and the bore of said sleeve including the end of the sleeve for excluding drilling fluid which may run down the driven member.

2. An apparatus of the character described including a gear box, a drive sleeve having its ends rotatably mounted in the gear box and provided with a polygonal bore, a drive rod having a cross-section shaped to correspond to the bore of the drive sleeve, packing means carried by the gear box including a washer seated on the gear box and engaging the end of the drive sleeve, a packing on the washer, and a clamp plate having rotary connection with the drive rod for compressing the packing around the drive rod.

3. A gear box, a gearing in said box, a drive rod vertically positioned in the box and projecting through the upper end thereof, means drivingly connecting the drive rod with the gearing, a packing assembly surrounding the drive rod including a packing element in sealing contact with said drive rod, and means for anchoring the packing assembly to the gear box.

4. In an apparatus of the character described, a gear box, a driven member having a polygonal shaped cross-section and projecting through the gear box, gearing in the box having driving connection with the driven member, a packing assembly having polygonal shaped openings sleeved over the driven member at the upper end of the gear box, and means for rotatably retaining said packing assembly on the gear box.

5. In an apparatus of the character described, a gear box, a driving sleeve rotatably supported in the gear box, a drive rod having driven engagement with said sleeve and slidable therethrough, a washer having driven connection with the drive rod, a cap plate having a packing recess and having driven engagement with the drive rod, a packing in said recess and engaging the washer to seal about the drive rod and prevent leakage between the drive rod and said sleeve, and means rotatingly anchoring the cap plate on the gear box to compress said packing.

6. In an apparatus of the character described, a gear box, a driving sleeve rotatably supported in the gear box, a drive rod having driven engagement with said sleeve and slidable therethrough, a washer having driven connection with the drive rod, a cap plate having a packing recess and having driven engagement with the drive rod, a packing in said recess and engaging the washer to seal about the drive rod and prevent leakage between the drive rod and said sleeve, said cap plate having an annular flange, and retaining members secured to the gear box and having portions engaging over said annular flange to retain the cap plate for rotation on said gear box.

7. In an apparatus of the character described, a gear box having an annular shoulder on its upper portion, a driving sleeve rotatably supported in the gear box, a drive rod having driven engagement with said sleeve and slidable therethrough, a cap plate having a packing recess and having driven engagement with the drive rod, packing means in said recess to effect a seal between the driving sleeve and the drive rod, an annular flange on said cap plate having a depending rim engageable over said annular shoulder to center the cap plate for rotation on the gear box by said drive rod, and anchoring means retainingly engaging the cap plate.

JOHN P. LANG.